United States Patent [19]
Masui et al.

[11] Patent Number: 4,868,763
[45] Date of Patent: Sep. 19, 1989

[54] KNOWLEDGE-BASED SYSTEM HAVING PLURAL PROCESSORS

[75] Inventors: Shiochi Masui, Kawasaki; Shunichi Tano, Machida; Seiji Sakaguchi, Yokohama; Motohisa Funabashi, Sagamihara, all of Japan

[73] Assignee: Hitachi, Ltd., Tokyo, Japan

[21] Appl. No.: 15,024

[22] Filed: Feb. 17, 1987

[30] Foreign Application Priority Data

Feb. 21, 1986 [JP] Japan .................................. 61-36679

[51] Int. Cl.$^4$ ........................ G06F 13/14; G06F 13/00
[52] U.S. Cl. .................................... 364/513; 364/200; 364/214.3
[58] Field of Search ............... 364/513, 148, 200, 300, 364/900, 131, 133, 138, 137

[56] References Cited

U.S. PATENT DOCUMENTS

| | | | |
|---|---|---|---|
| 4,467,436 | 8/1984 | Chance et al. | 364/133 |
| 4,478,629 | 10/1984 | Wood et al. | 364/138 |
| 4,591,983 | 5/1986 | Bennett et al. | 364/513 |
| 4,599,693 | 7/1986 | Denenberg | 364/513 |
| 4,635,199 | 1/1987 | Muraki | 364/513 |
| 4,644,461 | 2/1987 | Jennings | 364/200 |

OTHER PUBLICATIONS

"Method for Transferring Collected Data Between Rulebases of Expert Systems", *IBM Tech. Discl. Bul.*, vol. 28, No. 8, Jan. 1986, 3673-3675.
"An Experimental Computer Architecture Supporting Expert Systems and Logic Programming", Diel et al., IBM J. Res. Develop., vol. 30, No. 1, 1/86, pp. 102-110.
"Architectures for AI", Deering, BYTE, Apr. 1985, pp. 193-205.
"The Architecture of FAIM-1", Anderson et al., Computer, 1/87, pp. 55-64.

*Primary Examiner*—Clark A. Jablon
*Attorney, Agent, or Firm*—Antonelli, Terry & Wands

[57] ABSTRACT

A knowledge-based system comprising a plurality of knowledge processors each of which includes a knowledge base and performs a reasoning process for replying to a request from a user, and a file server which is connected to the knowledge processors through a transmission line. When each knowledge processor cannot resolve the user's request with the knowledge base of its own, it sends a request message to the other processor or processors through the transmission line. Reply messages from the other knowledge processors complying with the request message are managed in correspondence with the requests by the file server which receives the reply messages, and when a predetermined condition has been established, a reply is given to the knowledge processor which is the source of the request. Thus, each knowledge processor replies to the user's requests while automatically switching the reasoning process in a local mode which utilizes only the knowledge base of the processor itself and the reasoning process in a multiple or global mode which is based on cooperation of the other knowledge processor or processors.

4 Claims, 8 Drawing Sheets

KNOWLEDGE-BASED SYSTEM HAVING PLURAL PROCESSORS

BACKGROUND OF THE DISCLOSURE (1) Field of the Invention

The present invention relates to a knowledge-based system which performs reasoning processes by the use of many kinds of knowledge. More particularly, it relates to a knowledge-based system which includes a plurality of reasoning processors each having a knowledge base and in which each of the reasoning processors executes a reasoning process of its own while utilizing a result reasoned by another reasoning processor, according to the circumstances.

(2) Description of the Prior Art

Knowledge-based systems have come into the limelight as an approach effective for processing using a computer to solve a problem which is difficult to state by conventional procedural programming techniques wherein the sequence of use of all items of knowledge is completely stipulated by a control process. For example, a problem as to which the experience or perception of a skilled hand or expert forms part of resolving means.

The feature of the knowledge-based system consists of a knowledge which base for storing special knowledge is isolated from a program (reasoning mechanism) for resolving problems by the use of the knowledge, whereby the addition of new knowledge to the knowledge base and the change of the content of the knowledge already registered can be carried out independently of the program. That is, the knowledge-based system does not embed knowledge in the control process as in the conventional procedural programming, but it handles the knowledge as a simple data base. It is therefore advantageous in that, even when the whole aspect of knowledge for finishing up a system or the mutual relations of individual items of knowledge is/are unclear, software can be constructed by successively adding local or fragmentary items of knowledge to the knowledge base. The knowledge to be stored in the knowledge base includes, for example, rule type knowledge consisting of if-parts and then-parts, and fact type knowledge descriptive of facts corresponding to the if-parts.

Prominent as the examples of systems developed according to the knowledge base approach are "XCON" and "XSEL" by Digital Equipment Corp., "DIPMETER ADVISOR" by Schumberger Inc., and "YES/MVS" by IBM Inc.

All of the developed examples noted above, however, has computerized expertise or experience only in a very narrow field. At present, there has not been developed a large-scale knowledge base (the total number of items of knowledge reaches the order of $10^3$–$10^4$) for reasoning with many kinds and large amounts of knowledge as can be put into practical use in the field of, for example, monetary business. As causes therefor, it is mentioned that the processing time lengthens with increase in the amount of knowledge, so a practical reasoning ability is not attained, and further that a problem resolving program (reasoning mechanism) which allows knowledge expressions in many forms has not been developed.

SUMMARY OF THE INVENTION

An object of the present invention is to provide a knowledge-based system which can execute reasoning processes by utilizing large amounts of knowledge.

Another object of the present invention is to provide a knowledge-based system which permits multifarious knowledge expressions to be stored in a knowledge base.

Still another object of the present invention is to provide a knowledge-based system of high knowledge level which can promptly reply to many kinds of reasoning requests from users.

In order to solve the drawback involved in the knowledge-based system of the prior art for the reasons that various knowledge information items are described in a single expressive form and that reasoning processes are executed by, in effect, a single processor, the present invention distributes a knowledge base to a plurality of knowledge processors or knowledge processing stations which are coupled through communication means. Normally, each knowledge processor executes a reasoning process for replying to a user's request, by applying knowledge information stored in a knowledge base of its own (local mode). In contrast, in a case where any knowledge processor has met with a request which it cannot resolve with only the knowledge base of its own, it sends a request message asking for the reasoning process of the unresolved request to one or more specified other knowledge processors (multiple mode) or to all the other knowledge processors (global mode), and it replies to the user or executes the subsequent reasoning process by utilizing the reasoned result of the other knowledge processor.

In the present invention, a common memory for collectively managing request messages and replay messages issued by the respective knowledge processors is composed in order that the aforementioned reasoning process which is cooperatively executed by a plurality of knowledge processors may be realized without hindering the reasoning processes of the individual knowledge processors in the local mode. In practical use, this memory may be a memory which belongs to a message management device having a data processing function in itself, for example, a file server.

In the knowledge base with which each knowledge processor is furnished, knowledge information items are accumulated in the forms of, rules, frames or semantic networks. In a case where rule type knowledge (rules) consisting of if-parts and then-parts and fact type knowledge (facts) are accumulated in the knowledge base by way of example, one of the aspects of reasoning which each knowledge processor executes is forward reasoning wherein the coincidence between a condition item contained in the if-part of each rule and the fact is verified and wherein the content of the then-part of the rule whose condition items have all been satisfied is registered as a new fact in the knowledge base. Another aspect is backward reasoning wherein, when a fact having the same content as a certain given question is not found by way of example, a rule whose then-part has the same content as the question is sought out, to decide whether or not the same fact as a condition item described in the if-part of the rule is registered in the knowledge base. In the present invention, the aspect of the reasoning processes which each knowledge processor executes (the algorithm of a problem resolving program) may match with the expressive form of the knowledge information in the knowledge base possessed by the knowledge processor, and in principle, whatever reasoning aspects may be adopted. In the knowledge-based system of the present invention, accordingly, knowledge processors of different knowledge expressions or reasoning methods may well be combined.

In the present invention, each knowledge processor temporarily stores requests in the multiple mode or global mode issued by the other knowledge processors, in a request file along with user's requests in the local mode, and it reads out unresolved requests from the request file and executes the reasoning processes in succession. When, as a result of the reasoning, the request content has been resolved, the knowledge processor gives a reply message to a user interface as for the request in the local mode or to communication means as for the request in the multiple or global mode. In a case where each knowledge processor has been unable to resolve a request content with its own knowledge base, it supplies the other knowledge processors with a request message asking for the resolution, as for the request in the local mode, or supplies the communication means with a reply message to the effect that the resolution is impossible, as for the request in the multiple or global mode. The request messages and reply messages delivered to the communication means are written into the common memory. In a case where the common memory is of a file server, the respective reply messages are managed in correspondence with already stored request messages by the data processing function of the file server. Thus, when the status of a reply to one request has fulfilled predetermined conditions, the reply is given to the corresponding knowledge processor. In a case where the common memory does not have the data processing function, each knowledge processor is permitted to monitor the content of the common memory. The monitoring of the common memory may be realized with a communication processor by constructing the knowledge processor out of a reasoning processor and the communication processor.

The foregoing and other objects, advantages, manner of operation and novel features of the present invention will be understood from the following detailed description when read in connection with the accompanying drawings.

DESCRIPTION OF THE PREFERRED EMBODIMENTS

Figure 1:
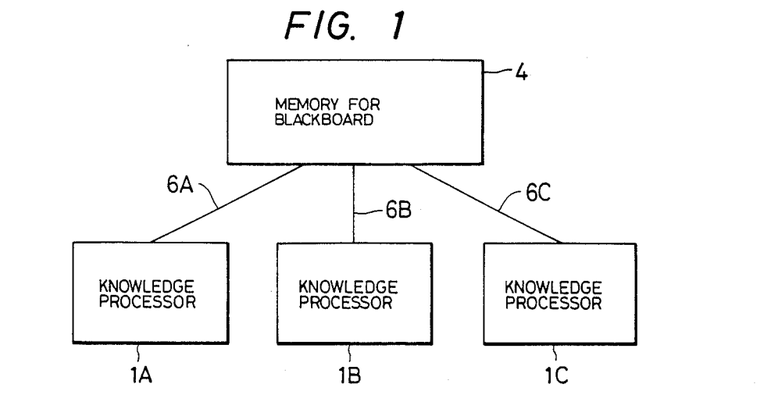
FIG. 1 is a block diagram for explaining the concept of a knowledge-based system according to the present invention.

FIG. 1 is a block diagram showing the concept of a knowledge-based system according to the present invention. A plurality of knowledge processors 1A, 1B and 1C are respectively connected to a common memory 4 functioning as a blackboard through lines 6A, 6B and 6C. Normally, the individual knowledge processors are performing data processing operations in a local mode independently of one another. When any of the knowledge processors has issued a reasoning request in a multiple mode or a global mode, the other knowledge processors start reasoning process operations conforming to the request and write the results on the blackboard in succession. Owing to the intervention of the blackboard, each knowledge processor can execute the reasoning processes while efficiently switching the independent operation and the cooperative operation.

Figure 2:
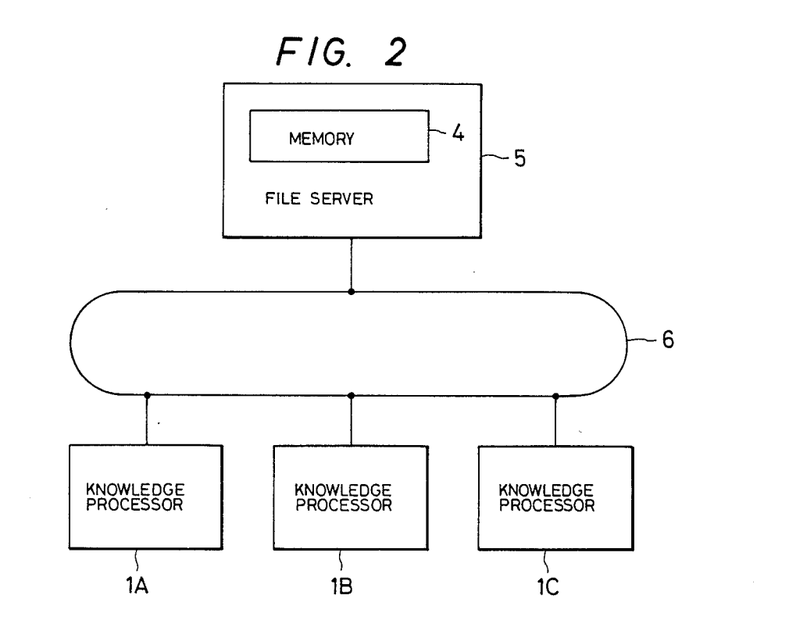
FIG. 2 is a block diagram showing a practicable example of the whole arrangement of the knowledge-based system of the present invention.

FIG. 2 shows an example of the practicable arrangement of the system illustrated in FIG. 1. The plurality of knowledge processors 1A, 1B and 1C are coupled by a looped transmission line 6, to which a file server 5 having the memory 4 is connected. Each knowledge processor delivers a message onto the transmission line 6 in a case of asking another knowledge processor for cooperation or in a case of replying to the request of another knowledge processor. The file server 5 performs recording of the content of the message in the memory (blackboard) 4, managing of the reply of another knowledge processor to a request issued by a first knowledge processor, and replying a reasoned result to a request source.

Figure 3:
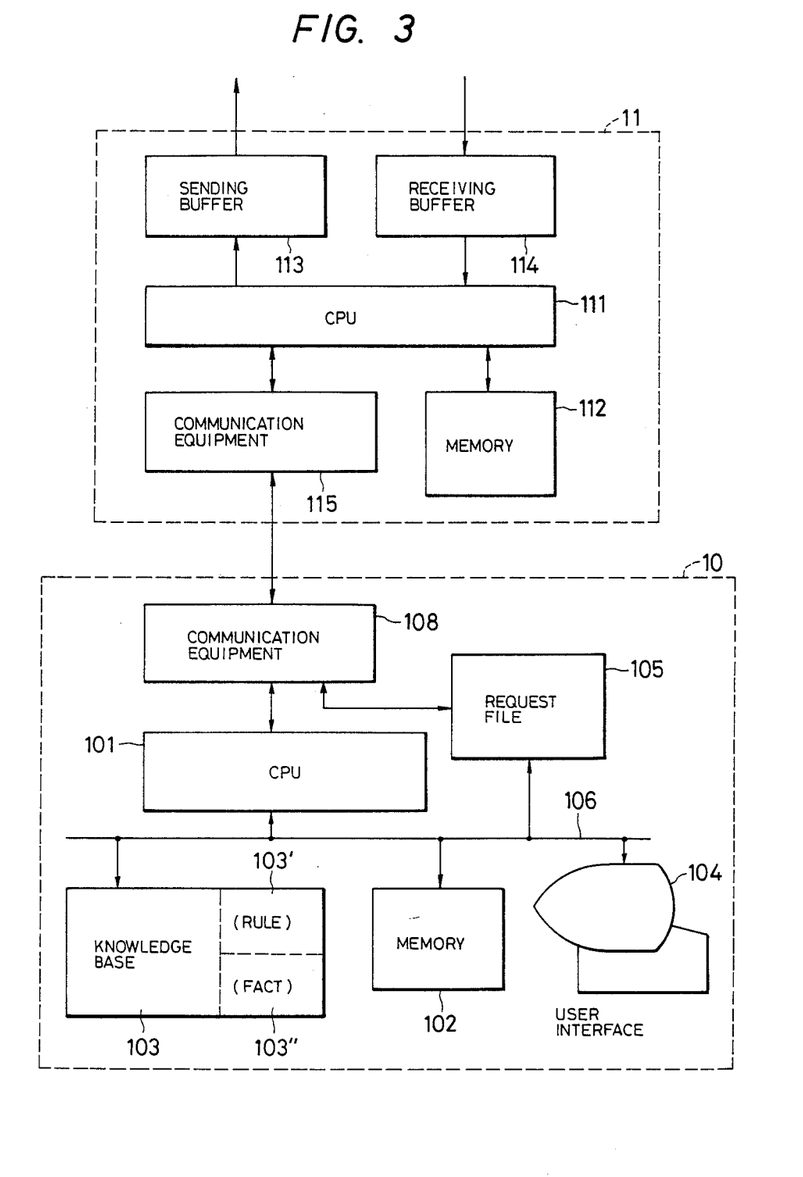
FIG. 3 is a block diagram showing the details of a knowledge processor.

FIG. 3 is a block diagram showing an example of the practicable structure of the knowledge processor (1A, 1B or 1C). The knowledge processor includes a reasoning processor 10 and a communication processor 11. The reasoning processor 10 is constructed of a data processing unit (CPU) 101, a memory 102 for storing a reasoning process program (problem resolving program), a file 103 for a knowledge base having a rule storing area 103' and a fact storing area 103", an interface 104 furnished with a display unit and a keyboard and serving for conversation with a user, a request memory 105 for temporarily storing a request to-be-resolved or the interim result of reasoning which has been given from an operator through the user interface 104 or from the file server 5 through the communication processor 11, and a communication equipment 108 serving as an interface with the communication processor 11. The elements 101 and 105 are interconnected by an internal bus 106. In addition, the communication equipment 108 is connected to the CPU 101 and the request memory 105 so as to supply the communication processor 11 with an output message from the CPU 101 and read data from the request memory 105.

The communication processor 11 is constructed of a data processing unit (CPU) 111, a memory 112 for storing programs and data, a sending buffer 113 for storing data which is to be sent to the transmission line 6, a receiving buffer 114 for storing data which has been received from the transmission line 6, and a communication equipment 115 serving as an interface with the reasoning processor 10.

The reasoning operation which the reasoning processor 10 executes, depends upon the form of knowledge stored in the knowledge base 103. The representative aspect of the reasoning operation is, for example, the backward reasoning detailed by E. H. Shortliffe in "Computer-based medical consultations: MYCIN," American Elseiver (1976). Besides, a potent substitute therefor is "PROLOG" which is used as a development base language by the Institute for New Generation Computer Technology in Japan.

Now, the operation of each reasoning processor 10 will be described as to a case of adopting the backward rule type reasoning for the reasoning processing program.

Figure 4:
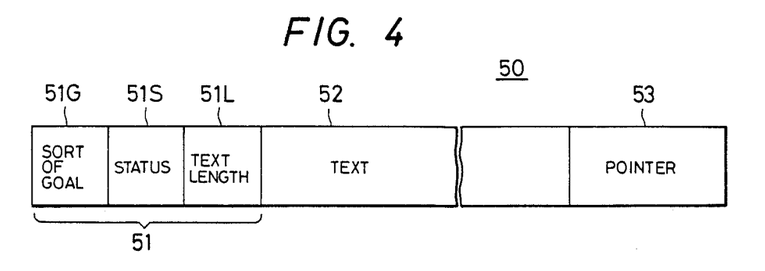
FIG. 4 is a diagram showing the format of a goal which is registered in a request file.

A request from a user or another knowledge processor, or a new problem to-be-solved having arisen in the course of reasoning (hereinbelow, such shall be generically termed "goal") is registered in the request file 105 in accordance with a format shown in FIG. 4. The goal 50 is configured of a management field 51, a text field 52 in which a character string indicating the content of the goal is recorded, and a pointer field 53 which serves to point to a sub goal for supporting the achievement of the goal. The management field 51 consists of a field 51G indicating the sort of the goal, a field 51S indicating the achieved status of the goal, and a field 51L indicating the length of the text field 52. Here, goal sort codes which are recorded in the field 51G have the following significances:

1: Goal requested by the user,
2: goal requested by another reasoning processor, and
0: goal generated in the course of reasoning.

In the status field 51S, "0" is written when the goal is not achieved yet, and "1" is written when it has already been achieved.

Meanwhile, in the knowledge base 103, a plurality of rules are stored in the rule storing area 103' in the following form:

if $X_1$ (and $X_2$) then Y and a plurality of facts $Y_1, Y_2, \ldots$ and $Y_n$ are stored in the fact storing area 103''. Here, each of the quantities $X_1, X_2, \ldots, Y$, and $Y_1, Y_2, \ldots$ is a character string.

The CPU 101 of the reasoning processor 10 selects a goal having "0" in the status 51S from within the request file 105, and performs a reasoning operation as to whether or not the fact described in the text field 52 within the goal 50 holds good, by applying the aforementioned rules and facts within the knowledge base.

Figure 5:
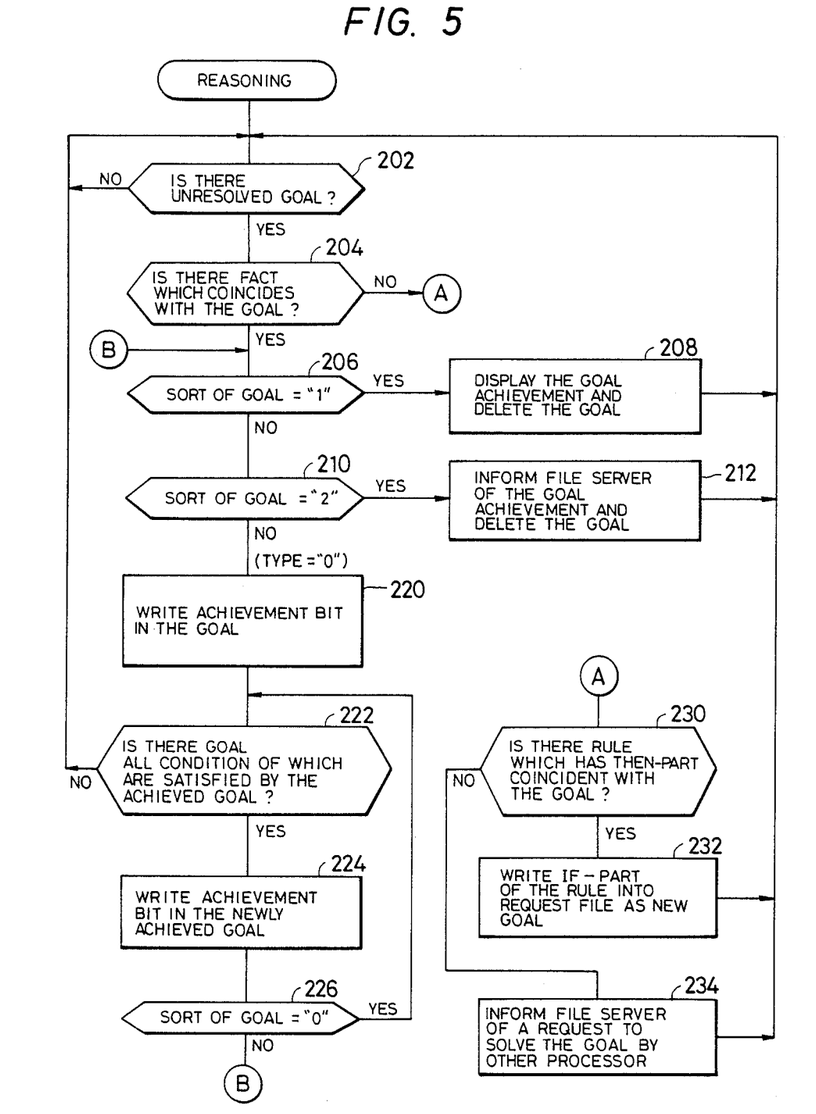
FIG. 5 is a flow chart showing the essential portions of a problem resolving program which is a reasoning mechanism.

FIG. 5 shows a flow chart of the reasoning process program which the CPU 101 executes in the present invention. First, unresolved goals each having "0" in the status 51S are successively sought out by reference to the request file 105 (step, 202). If there is an unresolved goal, the control process proceeds to a step 204, and if not, the step 202 is repeated. The reason is that, when a new request is received from the user through the interface 104 or when a request issued by another knowledge processor is received from the file server 5 through the communication processor 11, a new goal is added to the request file 105 by an interrupt process routine not shown. The step 204 checks whether or not a fact which coincides with the content of the text field 52 of the goal read out of the request file 105 is registered in the knowledge base 103''. If this fact exists in the knowledge base, the goal turns out to have been resolved. In this case, the sort 51G of the particular goal is checked at a step 206. If the sort 51G is "1," the control process proceeds to a step 208, at which "YES," for example, indicating that the request content has been affirmed is displayed on the user interface 104, and the particular goal is deleted from the request file 105, whereupon the process to the step 202. If the content of the field 51G is "2," the goal at issue is a request from another knowledge processor (step 210). Therefore, a step 212 informs the file server 5 of the achievement of the goal through the communication processor 11 and deletes the particular goal from the request file 105, whereupon the process returns to the step 202. A goal having "0" as the content of the field 51G is a sub goal which has appeared in the course of reasoning for resolving a certain goal. In a case where the goal resolved this time is such a sub goal, the control process proceeds to a step 220, at which the achievement of the goal is recorded in the request file 105. Specifically "1" is written into the status field 51S of the corresponding sub goal 50. The next step 222 checks whether or not there is a goal (corresponding to a parent goal for the sub goal) whose conditions are all satisfied owing to the achievement of the above sub goal. If there is such a goal, the achievement is recorded also for the parent goal at a step 224. Further, the sort of the achieved goal is decided at a step 226. If the sort is "0," the process returns to the step 222, and if not, the flow returns to the step 206.

In a case where, at the step 204, a fact coincident with the goal read out of the request, file 105 has not been found, the control process proceeds to a step 230, which checks whether or not a rule having the same text as the goal in the then-part thereof exists in the knowledge base 103'. If such a rule is found, a step 232 sets the if-part of this rule as the content of the text field 52 and registers a new goal having "0" in the goal sort 51G, in the request file 105, whereupon the process returns to the step 202. If the corresponding rule is not found at the step 230, this step is followed by a step 234, at which a request message for asking another knowledge processor for processing the goal not solved this time is delivered to the file server 5, whereupon the process returns to the step 202.

In compliance with a command from the reasoning processor 10 connected thereto, the communication processor 11 sends the transmission line 6 the message for asking another knowledge processor for the process of the unresolved goal. Also, it receives a message from another knowledge processor or the file server 5 and supplies the reasoning processor 10 with a message to be handled therein.

Figure 6A:
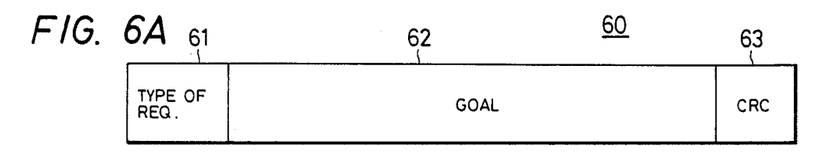
FIGS. 6A–6C are diagrams each showing the format of a message which is used for the communication between the knowledge processor and a file server.
Figure 6B:
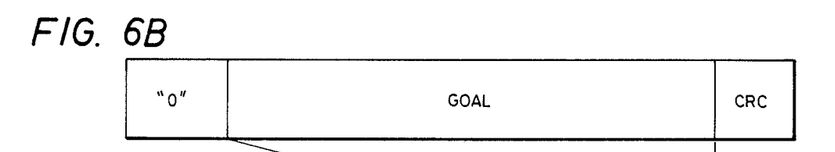
Figure 6C:
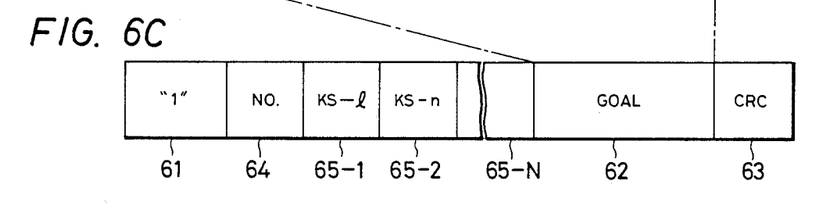

FIG. 6A shows the fundamental format of a communication message 60 which is sent to or received from the transmission line 6 by the communication processor 11 and the file server 5. This message 60 is basically formed of a field 61 indicating the type of a processing request, a goal field 62, and a cyclic check field 63. Fields which contain a source address and other general information are omitted from the drawing. In the goal field 62, the content of the goal 50 shown in FIG. 4 is recorded. There are two kinds of communication message formats as shown in FIGS. 6B and 6C. The message of FIG. 6B the type field 61 of which is "0" is a broadcast message which is forwarded to all the knowledge processors, and which is applied when the reasoning process is performed in the global mode. On the other hand, the message of FIG. 6C the type field 61 of which is "1" specifies the receiving knowledge processor and is used when the reasoning process is executed in the multiple mode. In FIG. 6C, numeral 64 denotes a field for indicating the number of knowledge processors to receive this message, and symbols 65-1 to 65-N denote fields for indicating processor addresses designating the respective knowledge processors. In a case where each knowledge processor sends a message to only the file server as a receiving destination, the type field 61 is set to "2."

Figure 7:
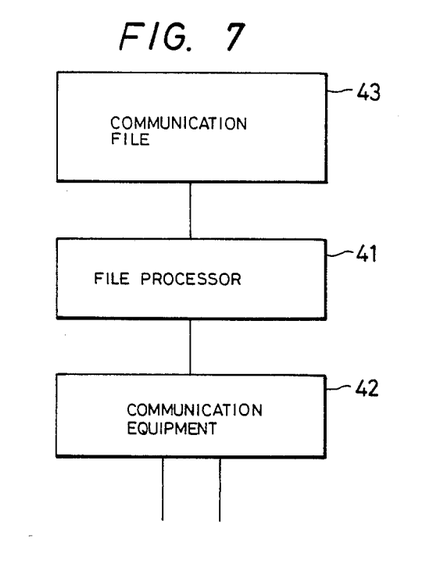
FIG. 7 is a block diagram showing the arrangement of the file server.

FIG. 7 is a block diagram showing the arrangement of the file server 5, in which numeral 41 denotes a file processor, numeral 42 a communication equipment connected to the transmission line 6, and numeral 43 a file unit functioning as a blackboard. The file processor 41 stores a message received from the communication equipment 42, in the file unit 43 as a record 70 which has a format in FIG. 8. Fields 71 and 72 in FIG. 8 correspond to the type field 61 and goal field 62 of the message 60, respectively. A source address field 73 indicates the sending source of this message, a field 74 indicates the number of knowledge processors to receive this message, and fields 75-1 to 75-N serve to record reply results from the respective knowledge processors as to the goal 72.

Figure 8:
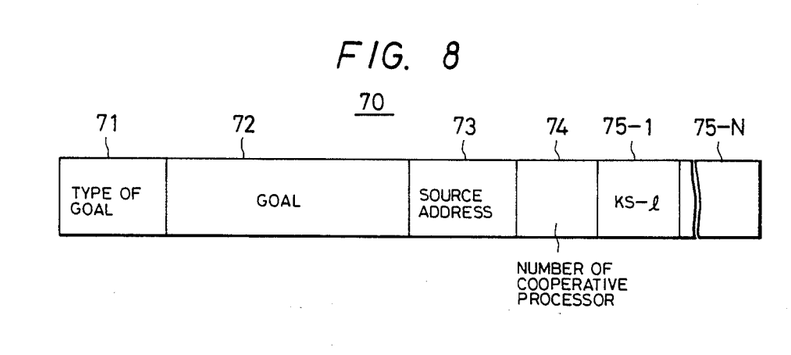
FIG. 8 is a diagram showing the format of records which the file server manages.

Upon receiving a reasoning request from a knowledge processor, the file server 5 registers the request in the file 43 in the form of the above-stated record 70. Also, upon receiving a reply from another knowledge processor in relation to a request already registered, the file server records the reply result, namely, the achievement or unachievement of a goal in the field 75 corresponding to the particular knowledge processor. When the file server 5 has received a reply of achievement from any knowledge processing system or a reply of unachievement from all the cooperative knowledge processors in relation to a requested goal, it reports this result to the knowledge processor being the request source.

Referring now to FIGS. 9–13, the operation of the system of the present invention will be described in conjunction with a simple specific example.

Figure 9:
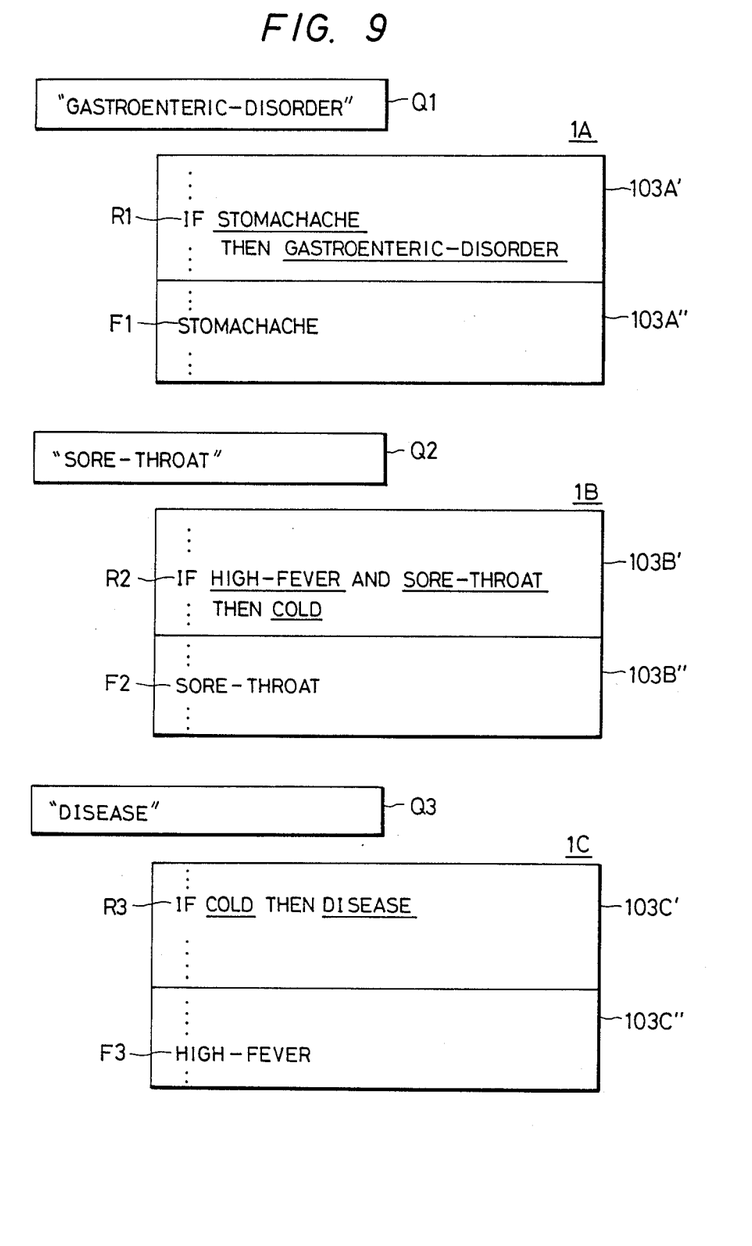
FIG. 9 is a diagram showing the contents of knowledge bases and those of requests for explaining the operation of the knowledge-based system according to the present invention.
Figure 10:
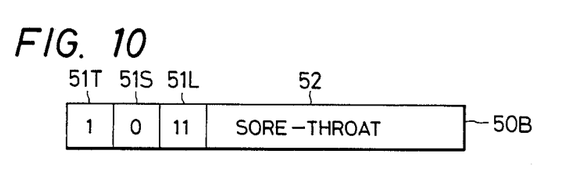
FIGS. 10–12 are diagrams for explaining the contents of goals which are registered in the request file in correspondence with the questions Q2, Q1 and Q3 in FIG. 9, respectively.

FIG. 9 shows the contents of the knowledge bases in the knowledge processors 1A, 1B and 1C, and requests Q1, Q2 and Q3 from users to the respective knowledge processors. By way of example, in a case where the question Q2 "SORE-THROAT?" has been asked of the processor 1B in the state in which a rule R2 and a fact F2 are already registered in the knowledge base portions 103B' and 103B" respectively, this request is stored in the request file 105B as an unresolved goal 50B shown in FIG. 10. In the reasoning process of the processor 1B, the fact F2 coincident with the text 52 is found at the step 204 of the program shown in FIG. 5. Therefore, the step 208 is executed, and "YES" is replied to the display unit of the user interface 104.

Figure 11:
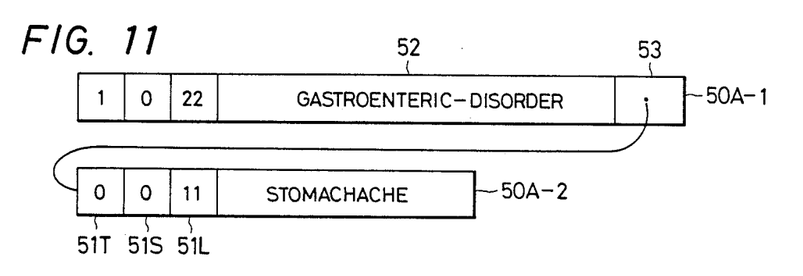

Regarding the knowledge processor 1A, the question Q1 "GASTROENTERIC-DISORDER?" is registered in the request file 105 as an unresolved goal 50A-1 shown in FIG. 11. As to this goal, a fact coincident with the text 52 does not exist in the knowledge base 103A". The step 230 in FIG. 5 is therefore executed, and a rule R1 the then-part of which has the same content as the text 52 is found. At the step 232, accordingly, a new goal 50A-2 shown in FIG. 11 is generated as the sub goal of the goal 50A-1, and it is added to the request file 105. As to the sub goal 50A-2, a fact F1 corresponding thereto exists in the knowledge base 103A". Therefore, when this goal is selected at the step 202, the step 220 is executed to write the bit "1" into the status field 51S of the goal 50A-2. Besides, the parent goal 50A-1 held in correspondence with this sub goal by the pointer 53 has its condition fully met by the achievement of the sub goal 50A-2. Therefore, the steps 222, 224 and 226 are gone through, and "YES" is finally replied to the display unit at the step 208. In the two cases mentioned above, the reasoning is completed in the local mode.

Figure 12:
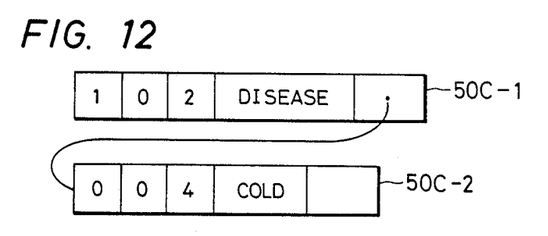

Let it now be assumed that the question Q3 "DISEASE?" has been received by the knowledge processor 1C. In this case, a goal 50C-1 in FIG. 12 is registered in the request file 105. Since, however, the corresponding fact does not exist in the knowledge base 103C", a sub goal 50C-2 whose content is the if-part of a rule R3 is generated. Nevertheless, a fact coincident with this sub goal 50C-2 is not found in the knowledge base 103C". In the knowledge processor 1C, therefore, the step 234 is executed to issue a request for a process in the multiple mode or the global mode to the other knowledge processors 1A and 1B. Hereunder, the cooperative operation of the other knowledge processors and the file server will be described with reference to FIG. 13 on the assumption of the case where the knowledge processor 1C has issued the request message of the global mode.

Figure 13:
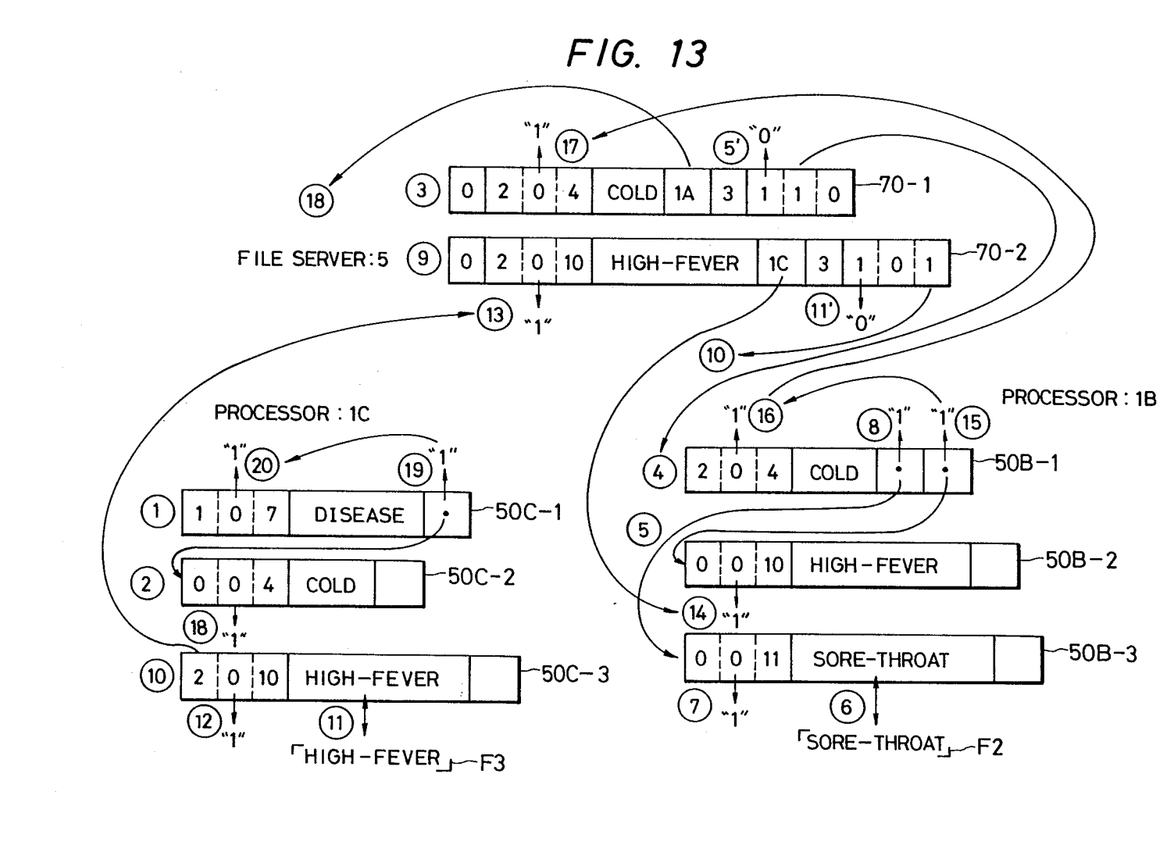
FIG. 13 is a diagram for concretely explaining a reasoning process which is executed for replying to the question Q3 in FIG. 9.

In FIG. 13, numerals 1–20 enclosed with circles indicate the order of occurrence of events, and the contents of the respective events are as follows:

Event 1: The knowledge processor 1C registers the goal 50C-1 in the request file 105.

Event 2: The knowledge processor 1C adds the sub goal 50C-2 to the request file.

Event 3: The request message 60 whose content is the sub goal 50C-2 is sent, and the file server 5 registers a record 70-1 in the file 43.

Event 4: The knowledge processor 1B having received the message 60 registers a goal 50B-1 in the request file, and joins the reasoning process.

Event 5: In the knowledge processor 1B, there is not a fact coincident with the text "COLD," and hence, sub goals 50B-2 and 50B-3 are added to the request file as the executed results of the steps 230 and 232.

Event 5': Upon receiving the reply of the unachievement of a goal from the knowledge processor 1A, the file server 5 sets "0" in a reply field corresponding to the processor 1A.

Events 6, 7: In the knowledge processor 1B, the fact F2 corresponding to the sub goal 50B-3 is found, and the achievement bit "1" is written into the status field of this sub goal.

Event 8: In the parent goal 50B-1, an index (in this example, bit "1") indicating that the condition item has held is recorded in the pointer field corresponding to the sub goal 50B-3.

Event 9: The knowledge processor 1B sends a request message 60' containing the sub goal 50B-2 which it cannot achieve by itself, and the file server 5 registers a record 70-2 whose content is this request, in the file.

Event 10: Upon receiving the request message 60', the knowledge processor 1C registers a goal 50C-3 in the request file and begins to cooperate in the reasoning process.

Events 11, 12: The knowledge processor 1C finds a fact F3 coincident with the goal 50C-3, and writes the achievement index bit "1" in the status field of this goal.

Event 11': Upon receiving a reply from the knowledge processor 1A, the file server sets "0" in a reply field corresponding to the processor 1A.

Event 13: The knowledge processor 1C informs the file server of the achievement of the goal 50C-3, and the achievement index bit is written into the status field of the record 70-2.

Event 14: Since the goal indicated by the record 70-2 has been achieved, the file server reports to the effect that the goal 50B-2 has been achieved, to the knowledge processor 1C designated by the source address.

Events 15, 16: The knowledge processor 1B senses that all the conditions of the goal 50B-1 have been met, owing to the achievement of the sub goal 50B-2, and it writes the achievement index bit in the status field of the goal 50B-1.

Event 17: The knowledge processor 1B reports the achievement of the goal 50B-1 to the file server, and this file server writes the achievement index bit into the status field of the record 70-1.

Event 18: The file server reports the achievement of the requested goal to the knowledge processor 1A designated by the source address of the record 70-1.

Event 19: Since the sub goal 50C-2 has been achieved, the knowledge processor 1C writes the index bit indicating that the condition item has been held, into the pointer field of the parent goal 50C-1.

Event 20: Since the goal 50C-1 has the condition item (in this case, one item) entirely satisfied, the achievement bit "1" is written into the status field. Thus, a reply affirming the request is given to the user.

As understood from the above description, in the knowledge-based system of the present invention, each knowledge processor normally executes a reasoning process for a request from the corresponding user in the local mode, and when it has become unable to resolve a goal with only the knowledge base thereof, it issues a request for the multiple mode or the global mode so as to be aided by the other knowledge processor or processors. In the multiple mode or global mode, each of the knowledge processors to cooperate for the request may merely process the goal registered in its own request file through the communication processor, as in the case of the local mode, and decide the source of the request when a result has been obtained, so as to send the result to the file server if the request is from the other knowledge processor. Even in a case where a plurality of sub requests in the multiple or global mode are derived from a single request, they are managed by the file server, and replies are forwarded to the sources of the respective requests. Therefore, the individual knowledge processors can perform reasoning operations while freely switching the local mode and the multiple or global mode.

According to the construction of the present invention, a knowledge base is distributed to a plurality of knowledge processors, and a request which cannot be resolved with the distributed knowledge base of each processor can be resolved by utilizing the knowledge base of the other processor. In this case, the plurality of distributed knowledge bases are referred to by a plurality of reasoning processors simultaneously and in parallel, so that a reasoned result is obtained very quickly even when the amount of knowledge of the whole system is enormous. Accordingly, in case of applying the present invention to a medical diagnostic system by way of example, a system in which any knowledge processor can freely utilize the expertise of other fields can be realized in such a way that the individual knowledge processors are caused to correspond to special fields such as internal medicine, surgery and pediatry. Also in monetary facilities, it is possible to build a reasoning process system of wide knowledge in which a knowledge processor having a knowledge base for judging the advance of funds can acquire the cooperation of a knowledge processor having a knowledge base for judging the business results of companies, by way of example.

Although the embodiments have been described on the premise of a system in which a file server and knowledge processors are coupled by a loop transmission line, the present invention may well be such that the respective knowledge processors are interconnected through the file server. In this case, a message exchange method may be adopted in which each knowledge processor delivers all requests and replies to the file server, while the file server decides the contents of them and distributes them to the corresponding knowledge processors.

We claim:

1. A knowledge-based system having a plurality of distributed knowledge bases coupled to each other, comprising:

transmission line means for transmitting a message;

message management means connected to said transmission line means for managing and storing messages; and a plurality of knowledge processor means connected to said transmission line means for replying to requests from respective users and resolving said requests by utilizing the knowledge information;

wherein each of said plurality of knowledge processor means includes interface means for interacting with a user, a knowledge base for storing knowledge information, reasoning means for executing a reasoning process to reply to a request from a user by utilizing the knowledge information, first means for sending, when said reasoning means cannot resolve the request from the user with the knowledge information stored in said knowledge base of said knowledge processor means, a request message requesting from at least one other knowledge processor means a resolution of the request through said transmission line means, second means for sending, when said reasoning means executes a reasoning process in response to a request message from any other knowledge processor means, a reply message indicating a result of the reasoning process to said message management means through said transmission line means, and means for outputting a reply to said interface means when said knowledge processor means receives from said message management means a reply message related to said request originally issued thereby; and wherein said message management means includes means for managing reply messages received from said plurality of knowledge processor means, corresponding to request messages already received and stored therein, and third means for sending, when a status of a reply to one request has satisfied a predetermined condition, a reply message to one of said plurality of knowledge processor means having originally issued the request.

2. A knowledge-based system having a plurality of distributed knowledge-bases coupled to each other comprising:
- a plurality of knowledge processors each of which performs a reasoning operation in compliance with a request from a user; and
- message management means connected with said respective knowledge processors through a transmission line for managing and storing messages;
- wherein said each knowledge processor includes
- interface means for interfacing with the user,
- communication means for sending and receiving messages to and from said transmission line,
- first memory means for storing knowledge information,
- second memory means for storing unresolved requests including a first request supplied by said user interface means, a second request supplied by any other knowledge processor through said communication means and a third request generated by said knowledge processor during a reasoning operation being performed on a first or a second request and
- a reasoning processor for reading out an unresolved request from said second memory means, for performing a reasoning operation to resolve said unresolved request by applying said knowledge information, and for delivering a reply message to said user interface means when said reasoning processor has determined a final result of said reasoning operation of a first request, said reasoning processor including means for delivering a reply message to said transmission line through said communication means when said reasoning processor has determined a final result of said reasoning operation of a second request, and means for delivering a request message, requesting any other knowledge processor or knowledge processors to resolve a first or a third request, to said transmission line through said communication means when said reasoning processor cannot resolve the first request or the third request with the knowledge information stored in said first memory, said first request or said third request being treated as a second request in said other knowledge processor or said other knowledge processors;
- wherein said message management means includes
- third memory means for storing request messages delivered by said knowledge processors to said transmission line, and
- second processor means for processing reply messages delivered by said knowledge processors to said transmission line, in correspondence with said request messages stored in said third memory means and for delivering a reply message to said knowledge processor having originally issued said request, when a reply to one request message has satisfied a predetermined condition.

3. A knowledge-based system according to claim 2, wherein:
- each of said reasoning processors sends a request message to a plurality of other knowledge processors, and said second processor means has means for judging whether a reply message reporting resolution of a request has been received or a predetermined number of reply messages reporting that the request cannot be resolved are received from one or all of the knowledge processors having received the request message, said second processor means operating to deliver a reply message affording a reasoned result, to a sending source of the request according to the judgment of said judging means.

4. A knowledge-based system according to claim 3, wherein said transmission line is a loop transmission line which serially connects respective knowledge processors and message management means.

* * * * *